Jan. 7, 1969    S. A. COGSDILL    3,420,125
DEBURRING TOOL
Filed July 5, 1966    Sheet 1 of 2
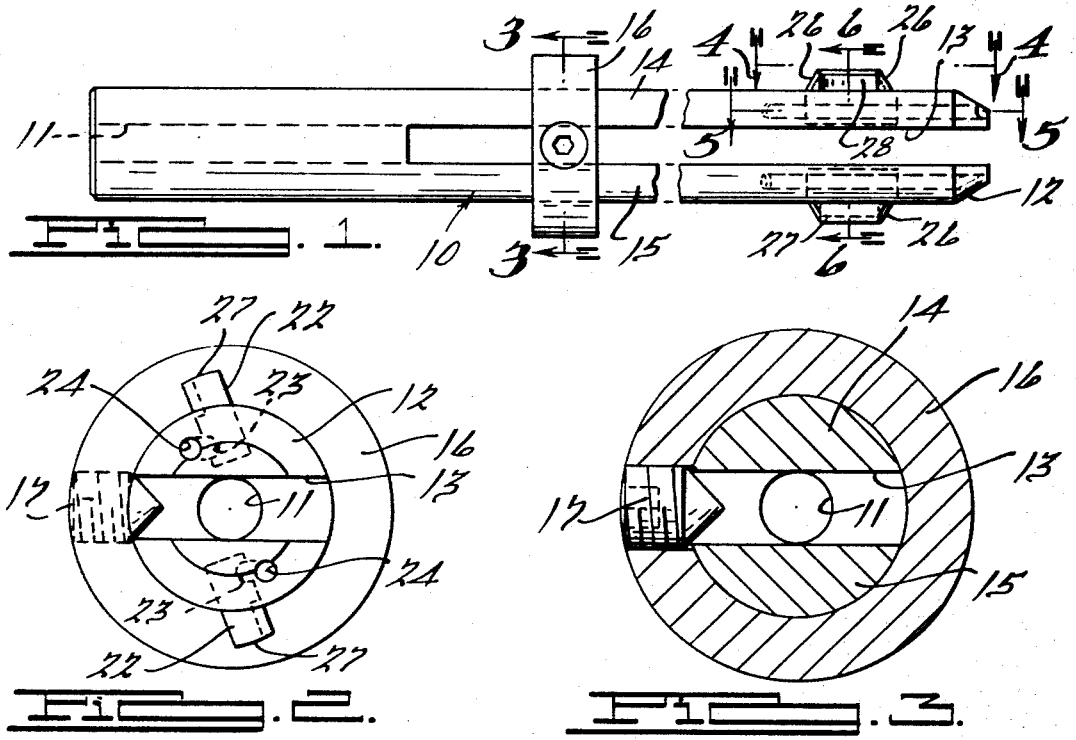
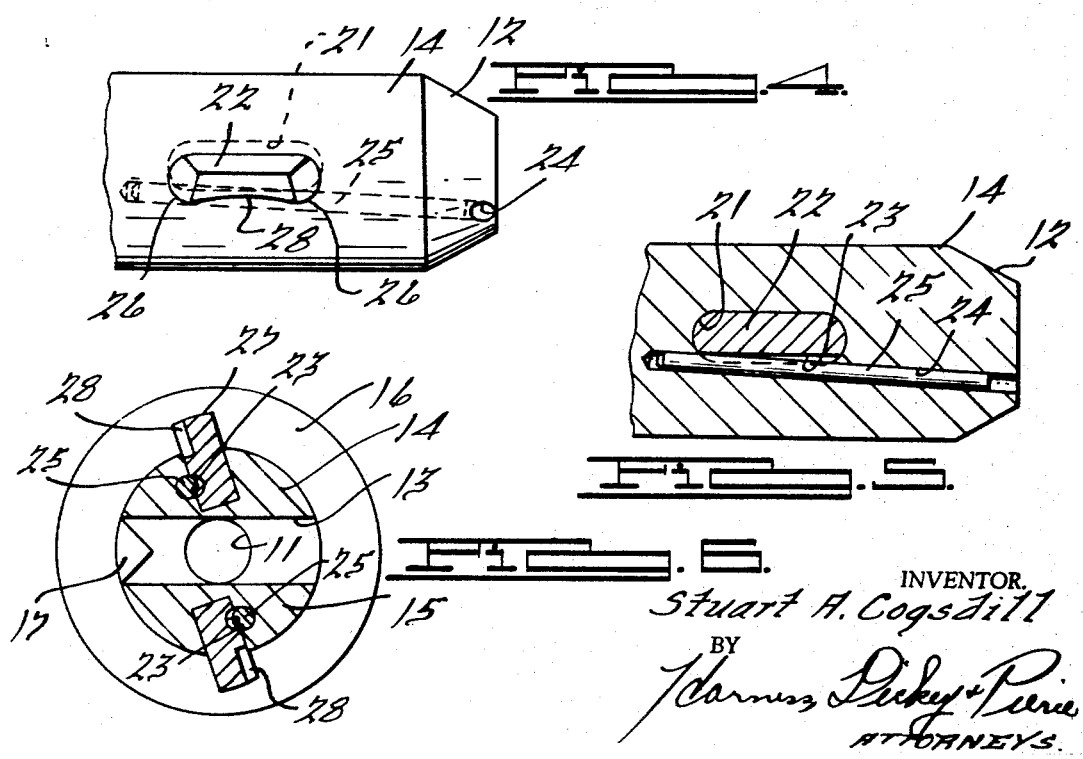
INVENTOR.
Stuart A. Cogsdill
BY
Harness, Dickey & Pierce
ATTORNEYS.

Jan. 7, 1969  S. A. COGSDILL  3,420,125
DEBURRING TOOL
Filed July 5, 1966  Sheet 2 of 2
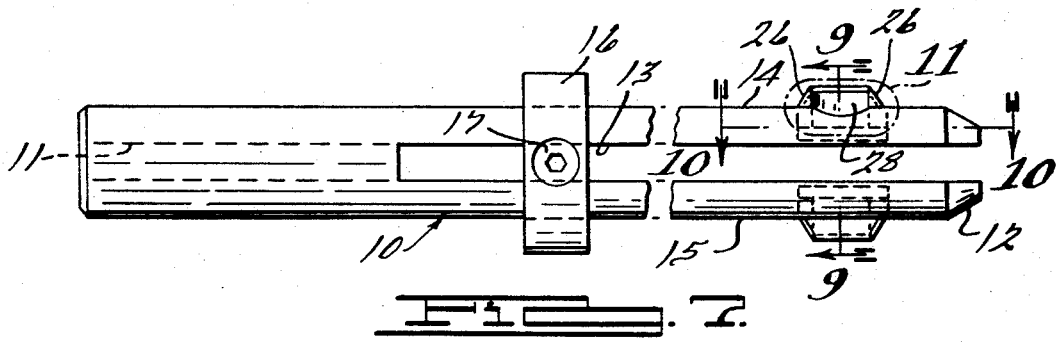
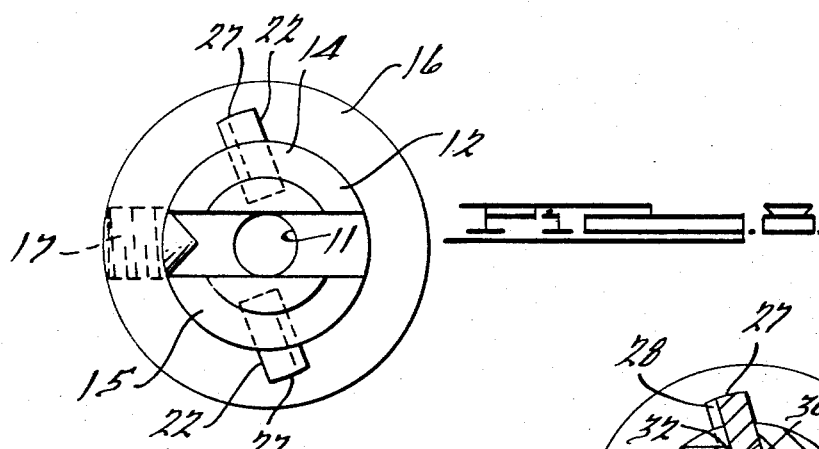
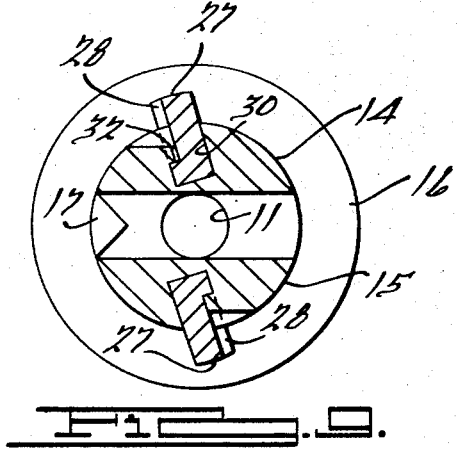
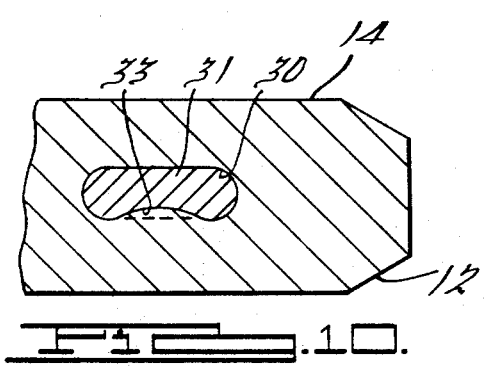
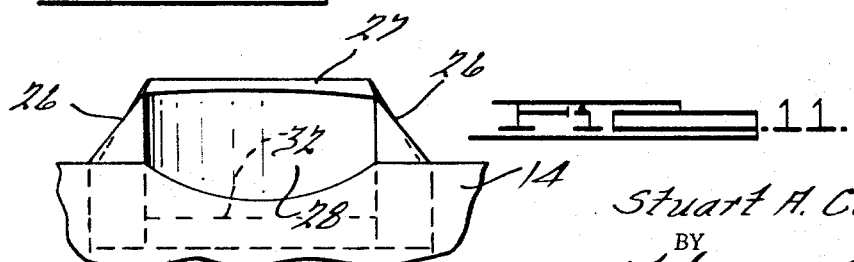
INVENTOR.
Stuart A. Cogsdill
BY
ATTORNEYS.

United States Patent Office 3,420,125
Patented Jan. 7, 1969

3,420,125
DEBURRING TOOL
Stuart A. Cogsdill, Orchard Lake, Mich., assignor to Cogsdill Tool Products, Inc., Detroit, Mich., a corporation of Michigan
Filed July 5, 1966, Ser. No. 566,702
U.S. Cl. 77—73.5    2 Claims
Int. Cl. B23b 51/10; B23d 77/02

ABSTRACT OF THE DISCLOSURE

A deburring tool is constructed from an element made of a case hardenable material having a slot therein to form tangs with at least one of the tangs having a recess for supporting a blade of hard cutting material. This permits the body to be made of a cheap, soft material while providing cutting edges of hard cutting material.

This invention relates to deburring tools and particularly to a deburring tool which has hard cutting blades mechanically secured in spring tangs of the tool body.

The deburring tool of the present invention has a cylindrical body containing a central aperture and a diametrical slot rearwardly from the blade-supporting end. The body is preferbaly made of a soft steel which is case hardened or otherwise treated to have spring properties in the two like branches or tangs. A recess is provided in each tang for the reception of a hard metal cutting blade which is secured in position by a hard pin in an aperture which communicates with a groove in the adjacent face of the blade.

Accordingly, the main objects of the invention are: to provide a deburring tool made from a cylindrical tube having a slot extending rearwardly from the cutting end forming spring tangs having a recess for receiving the blade of hard material which is mechanically secured in locked position therein; to provide blades in tangs of a hollow slotted body which are spread apart and hardened to provide resiliency thereto; to provide a deburring tool having a pair of spring tangs and cutting blades near the open end with a ring having a single set screw therein which secures the ring in position along the tangs and adjusts the fulcrum point thereof and, in general, to provide a deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of a deburring tool embodying features of the present invention;

FIG. 2 is an end view of the tool illustrated in FIG. 1;

FIG. 3 is an enlarged sectional view of the structure illustrated in FIG. 1, taken on the line 3—3 thereof;

FIG. 4 is a large broken end view of the structure illustrated in FIG. 1, as viewed from the line 4—4 thereof;

FIG. 5 is an enlarged sectional view of the structure illustrated in FIG. 1, taken on the line 5—5 thereof;

FIG. 6 is an enlarged sectional view of the structure illustrated in FIG. 1, taken on the line 6—6 thereof;

FIG. 7 is a view of structure similar to that illustrated in FIG. 1, showing a further form of the invention;

FIG. 8 is an enlarged end view of the structure illustrated in FIG. 7;

FIG. 9 is an enlarged sectional view of the structure illustrated in FIG. 7, taken on the line 9—9 thereof;

FIG. 10 is an enlarged sectional view of the structure illustrated in FIG. 7, taken on the line 10—10 thereof; and FIG. 11 is an enlarged broken view of the structure illustrated in FIG. 7, as viewed within the oval 11 thereof.

The body 10 of the deburring tool is of cylindrical form having a central aperture 11 therethrough. The cutting end of the body is tapered at 12 for guiding the tool into an aperture. Rearwardly from the tapered end 12, a slot 13 is provided on the diameter of the body 10 to form two tangs 14 and 15. In the present arrangement, the diameter of the aperture 11, the width of the slot 13 and the thickness of the tangs 14 and 15 are the same. The body 10 is preferably made from a soft steel and the tangs 14 and 15 are preferably spread apart before the metal of the body is carbonized or otherwise hardened to have the tangs 14 and 15 form spring elements. The effective length of the tangs is controlled by a ring 16 having a set screw 17 therein which, as illustrated in FIG. 3, engages the inner edges of the tangs 14 and 15 and forces them apart against the inner surface of the ring. The ring forms an adjustable fulcrum which controls the strength of the tangs and the deflection of the cutting blades.

Each of the tangs adjacent to the tapered end 12 is provided with an aperture 21 for receiving a blade 22 of the tool. The blade 22 is provided with a groove 23 and an aperture 24 is drilled at an angle to the center of the body into each tang 14 and 15 from the end having the taper 12. When drilling the hole, the blade 22, before hardening, may be placed in its aperture 21 so that the drill can shape the groove to the hole 24 when passing through the aperture 21. After the blade 22 is hardened and inserted in the aperture 21, a hardened pin is driven into the aperture 24 to enter groove 23 and thereby mechanically retain the blade 22 in firm fixed relation within the aperture 21.

Each side of the blade is sloped rearwardly from a cutting edge 26 which converges toward the top to form a cam which causes the tangs 14 and 15 to move together after the aperture has the burr removed therefrom as the body 10 is rotated and moved therethrough. Upon return of the blade from the aperture, the opposite side of the aperture has the burr removed therefrom as the cutting edge causes the tangs 14 and 15 to move together so that the blades can be withdrawn from the aperture. The top of the blade is relieved rearwardly on an arc 27 struck from a radius substantially equal to that of the deburred aperture so as to have surface engagement with the wall thereof when passed therethrough. The forward face of the blade has a recess 28 cut therein to provide chip clearance for the cutting edges.

With this arrangement, the body is made of an inexpensive soft steel while the blades are made of a hard tool cutting material mechanically retained in recesses in the tangs by the insertion of the hand pins 25 which lock the blades within the recesses. By hardening the soft material of the body, a spring effect is provided to the tangs, the strength of which is controlled by the set screw 17 in the ring 16 which adjusts the force required to deflect the blades so as to pass through the aperture being deburred.

A further form of the invention is illustrated in FIGS. 7 to 11 inclusive. In this arrangement, the same body 10 is utilized having the central aperture 11, the tapered end 12 and the slot 13 which forms the tangs 14 and 15. Each of the tangs adjacent to the open end of the slot has an oval shaped aperture 30 which slopes at an angle of less than 90° to the slot relative to the direction of rotation of the body 10. Hard inserts 31 are placed in the recesses 30 and the soft metal of the tangs 14 and 15 is upset to engage a ledge 32 near the bottom of the insert formed by the arcuate face 33 provided in the forward wall of the insert. This upset metal secures the inserts within the recesses 30 and after the hardening of the body 10 the inserts are securely locked in position. Sloping cutting edges 26 are provided on the leaded and following ends of the inserts and these and the top edge are relieved rearwardly from the front face of the inserts. The structure of FIGS. 7 to 11 is a disclosure of a different method of mechanically locking the inserts in the recess adjacent to the ends of the tangs 14 and 15. The ring 16 with the set screw 17 is employed for controlling the spring tension on the cutting edges in the manner pointed out hereinabove.

What is claimed is:

1. In a deburring tool, a cylindrical body made of case hardenable steel having a diametrical slot extending inwardly from one end thereof forming a pair of spaced tangs case hardened to resist deflection at least one of said tangs adjacent to said one end of the body having a blade receiving recess, a cutting blade of hard material secured within said recess, said tang having an aperture forming a notch communicating with said recess, said blade having a notch facing the notch in said recess, and a rod for securing the blade locked within the recess when disposed in said notch through said aperture.

2. A deburring tool as recited in claim 1, wherein the advancing face of the blade is recessed between end cutting edges thereof to provide chip clearance.

References Cited

UNITED STATES PATENTS

| Re. 19,182 | 5/1934 | Emmons | 77—70 |
| 836,988 | 11/1906 | Oldham | 143—141 |
| 3,217,570 | 11/1965 | Cogsdill | 77—73.5 |
| 3,230,798 | 1/1966 | Kubicek et al. | 77—73.5 |

FOREIGN PATENTS 367,011  1/1923  Germany.

FRANCIS S. HUSAR, *Primary Examiner.*

U.S. Cl. X.R.

143—141; 145—123